United States Patent [19]
Aldenhoven et al.

[11] Patent Number: 4,835,760
[45] Date of Patent: May 30, 1989

[54] LOADING DEVICE FOR AN APPARATUS FOR RECORDING AND/OR RE-PRODUCING SIGNALS, AND APPARATUS PROVIDED WITH THE LOADING DEVICE

[75] Inventors: Ghislanus M. M. Aldenhoven, Hasselt; Hermanus F. Einhaus, Ham; René M. F. Boonen, Hasselt, all of Belgium

[73] Assignee: U.S. Philips Corporation, New York, N.Y.

[21] Appl. No.: 131,146

[22] Filed: Dec. 10, 1987

[30] Foreign Application Priority Data

Dec. 24, 1986 [NL] Netherlands ............... 8603296

[51] Int. Cl.$^4$ ................... G11B 1/00; G11B 25/04
[52] U.S. Cl. ................................................ 369/75.2
[58] Field of Search ......................................... 369/75.2

[56] References Cited

U.S. PATENT DOCUMENTS

| | | | |
|---|---|---|---|
| 4,631,716 | 12/1986 | Ikedo et al. | 369/75.2 |
| 4,653,039 | 3/1987 | Ueno et al. | 369/75.2 |
| 4,701,701 | 10/1987 | Imai | 369/75.2 |

Primary Examiner—Steven L. Stephan
Attorney, Agent, or Firm—F. Brice Faller

[57] ABSTRACT

Loading device for an apparatus for recording and/or reproducing signals, and apparatus provided with the loading device. The loading device (1) comprises a movable drawer (19) by means of which the record carrier (15) is movable into and out of the housing (3) of the apparatus through an opening in a wall of this housing (3). Guide means (22, 23, 24) are provided for guiding the movement of the drawer (19) relative to the housing (3) and comprise guide elements (23) which are guided in guideways (22), which guide means guide the drawer (19) in guiding directions (26, 27) which enclose an angle with each other. Further, there are provided drive means for moving the drawer (19), comprising gear racks (29) on the drawer, gears (31, 32, 34, 36) which are in mesh therewith, and drive shafts (35, 41), the flanks of the teeth of each gear rack (29) and of the gears (31, 32, 34) which mesh therewith being inclined relative to the axis of rotation of the drive shaft (35) in such a way that for moving the drawer (19) the drawer is subjected to a force (F) which comprises components (F1, F2) parallel to said guiding directions (26, 27).

10 Claims, 11 Drawing Sheets

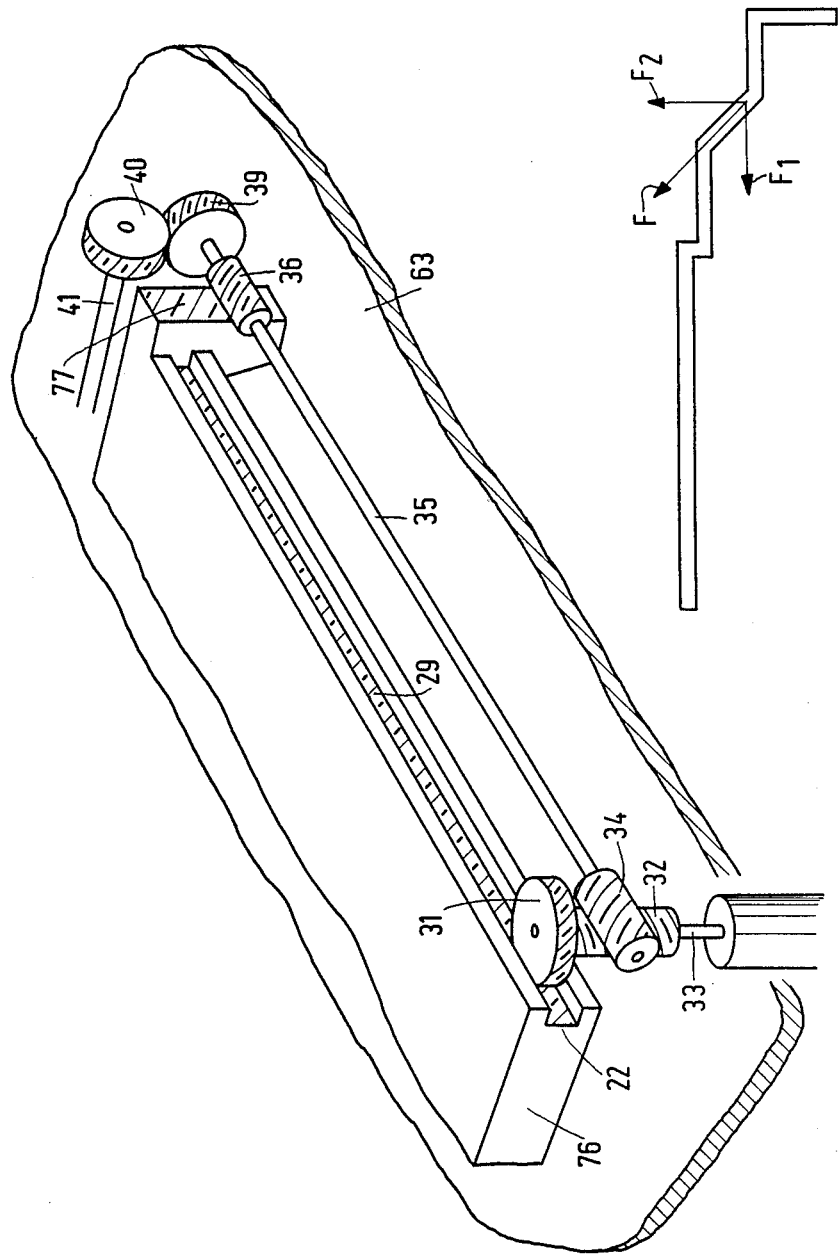

LOADING DEVICE FOR AN APPARATUS FOR RECORDING AND/OR RE-PRODUCING SIGNALS, AND APPARATUS PROVIDED WITH THE LOADING DEVICE

BACKGROUND OF THE INVENTION

The invention relates to a loading device for an apparatus for recording and/or reproducing signals on/from a record carrier. The record carrier can be moved into and out of the housing of the apparatus through an opening in a wall of the housing, by means of a movable drawer. Guide means guide the movement of the drawer relative to the housing, which guide means comprise guide elements guided in guide-ways and guide the drawer parallel to guiding directions which enclose an angle with one another. Drive means the comprising gear racks, gear meshing with the racks and drive shafts, move the drawer. The driver means include drive elements which for moving the drawer exert on the drawer a force comprising components parallel to the guiding directions.

A loading device of this type is known from GB-A No. 2,112,994. Such a loading device is known for use with disc-record players and magnetic-tape apparatuses. In this loading device the record carrier is moved over some distance in a horizontal direction and subsequently in a vertical direction by means of the drawer to allow the record carrier, such as a disc, to cooperate with a recording and/or reproducing element of the apparatus for the purpose of recording or reproduction. In this known loading device the drive elements of the drive means provide the advantage that during driving a force is exerted which during the loading movement is directed at an angle to the horizontal and the vertical. In the known loading device these drive elements comprise plates with inclined grooves and gear racks, the choice of the inclination of the grooves enabling the velocity of the drawer movement and the force exerted on the drawer during the drawing movement to be varied independently of one another. This enables for example the horizontal movement to be performed with a comparatively high speed and the vertical movement with a lower speed, which implies that the force exerted during the vertical movement is greater than during the horizontal movement. This may have the advantage that during one of the movements, in the present case the vertical movement, another mechanism can be actuated without requiring the use of a more powerful drive motor or without adversely affecting the speed of the other movement. This other mechanism may be a disc-pressure means of a disc-record player, which pressure means is actuated during the vertical part of the movement and presses the disc against the turntable after loading.

In principle, the horizontal length of the L-shaped guideway in the known loading device cannot be longer than the longitudinal dimension of the horizontal projection of the inclined groove in the drive element. The same applies to the vertical dimension of the guideway, which in principle cannot be larger than the longitudinal dimension of the vertical projection of the inclined groove. As a result of this, the length of the inclined groove in the drive element determines the maximum travel of the drawer in the horizontal and the vertical direction. Moreover, in the known loading device a small vertical movement of the drawer in principle cannot be combined with a large horizontal movement, because such an inclination of the inclined groove gives rise to a self-braking effect. Further, in the known apparatus the depth of the housing must be comparatively large relative to the depth of the drawer. This is necessary because the drive element must always perform a horizontal movement in order to make the vertical movement.

SUMMARY OF THE INVENTION

It is the object of the invention to obtain a large travel in a first direction during the high-speed loading movement and a comparatively small travel in a second direction during which a comparatively large force is exerted.

To this end the gear racks are situated on the drawer and the gear racks and gears form part of the drive elements. The flanks of the teeth of each gear rack and of the gears in mesh therewith are inclined in such a way relative to the axis of rotation of the drive shaft that the force for moving the drawer is exerted on the drawer. Thus, the drawer can be moved rapidly inwards or outwards over a large distance relative to the housing by exerting a comparatively small force. Further, during the movement in the second direction a large force can be exerted, enabling a motor of comparatively low power to be used, which can drive another mechanism in the period in which said movements are not performed. The speed in one direction and the force in the other direction can be determined freely and independently of each other within ample limits by a suitable choice of the tooth angle of the teeth of the racks and the drive gears. Another advantage is that during the vertical movement of the drawer the drive means do not perform any further horizontal movement. The mounting depth needed inside the housing of the apparatus in view of the drawer movement is therefore limited to the dimensions necessary to obtain the horizontal movement. In practice this means that reckoned over the depth of the housing the drive means occupy hardly more space than the depth of the drawer. The inclined teeth of the gears and the gear rooks allow the drawer to perform any movement during guiding in the inward or the outward direction, provided that this movement follows a path whose derivative does not change sign. The gear racks can be situated in control grooves in which drive gears are guided axially relative to the axis of rotation of the driveshaft. In this way the drive gears can actuate the drawer for movement in two guiding directions. A first direction may be parallel to the direction of the inward and outward movement of the drawer, whilst a second direction may be parallel to the axis of rotation of the drive gears.

Each drive gear can be rigidly coaxially connected to a first worm gear, the drive combination of each drive gear and first worm gear being axially movable relative to the housing.

The combination comprising a drive gear and a first worm gear, which combination is bodily movable in an axial direction, thus enables the drawer to be moved in the two guiding directions, the axial displacement of the drive combination providing the drawer movement in the second guiding direction.

Each first worm gear can be driven by a second worm wheel mounted on a drive shaft, in such a way that depending on the position of the guide elements in the guideways each drive combination rotates, causing the drawer to be moved in the first guiding direction, or each driving combination moves in an axial direction, causing the drawer to be moved in the second guiding direction. Thus, the components forming part of the drive means may be adapted to the desired drawer movement, whilst for driving an electric motor of comparatively low power may be used.

The first and second gear racks can be arranged on the drawer, so that they enclose an angle with one another, drive gears cooperating with the first gear racks during the movement of the drawer in the first guiding direction and cooperating with the second gear racks during the movement in the second guiding direction. The use of gear racks which are inclined relative to each other has the advantage that they can readily be integrated in the drawer, whilst only a small number of parts are required for the drive means.

The teeth of each first gear rack can continue in the second gear racks, the inclination of the teeth relative to the first guiding direction being substantially 30°. The use of gear racks which are preferably arranged as a U enables a suitable drawer movement to be obtained in a horizontal direction, corresponding to the first guiding direction, and in a vertical direction, corresponding to the second guiding direction. A tooth angle of approximately 30° provides an optimum speed ratio between the horizontal and the vertical part of the movement.

The invention further relates to an apparatus provided with such a loading device. Wherein the drive means comprise a differential which drives a further mechanism of the apparatus after termination of the drawer drive. The use of a differential enables the drive motor for the drawer to be used for driving another mechanism of the apparatus after termination of the drawer drive. In addition to the advantage of a single-motor drive, this has the advantage that no special provisions are necessary to separate the two functions of guiding the drawer and driving the other mechanism. This can be achieved by utilising the drawer movement.

A preferred embodiment of such an apparatus is characterized in that after driving the drawer the differential drives a tilting device for tilting an objective by means of which signals are recorded on and/or read from a disc-shaped record carrier. This yields an apparatus in which by means of a differential the motor drive of the loading device, after termination of the drawer drive, is utilized for actuating a tilting device during reading and/or recording in a disc-record player.

BRIEF DESCRIPTION OF THE DRAWING

FIG. 11 is a perspective view of the loading device in a third embodiment;

FIG. 12 diagrammatically shows directions in which the drawer can be guided by the guide means during the drawer movement.

DETAILED DESCRIPTION OF THE PREFERRED EMBODIMENT

Figure 1:
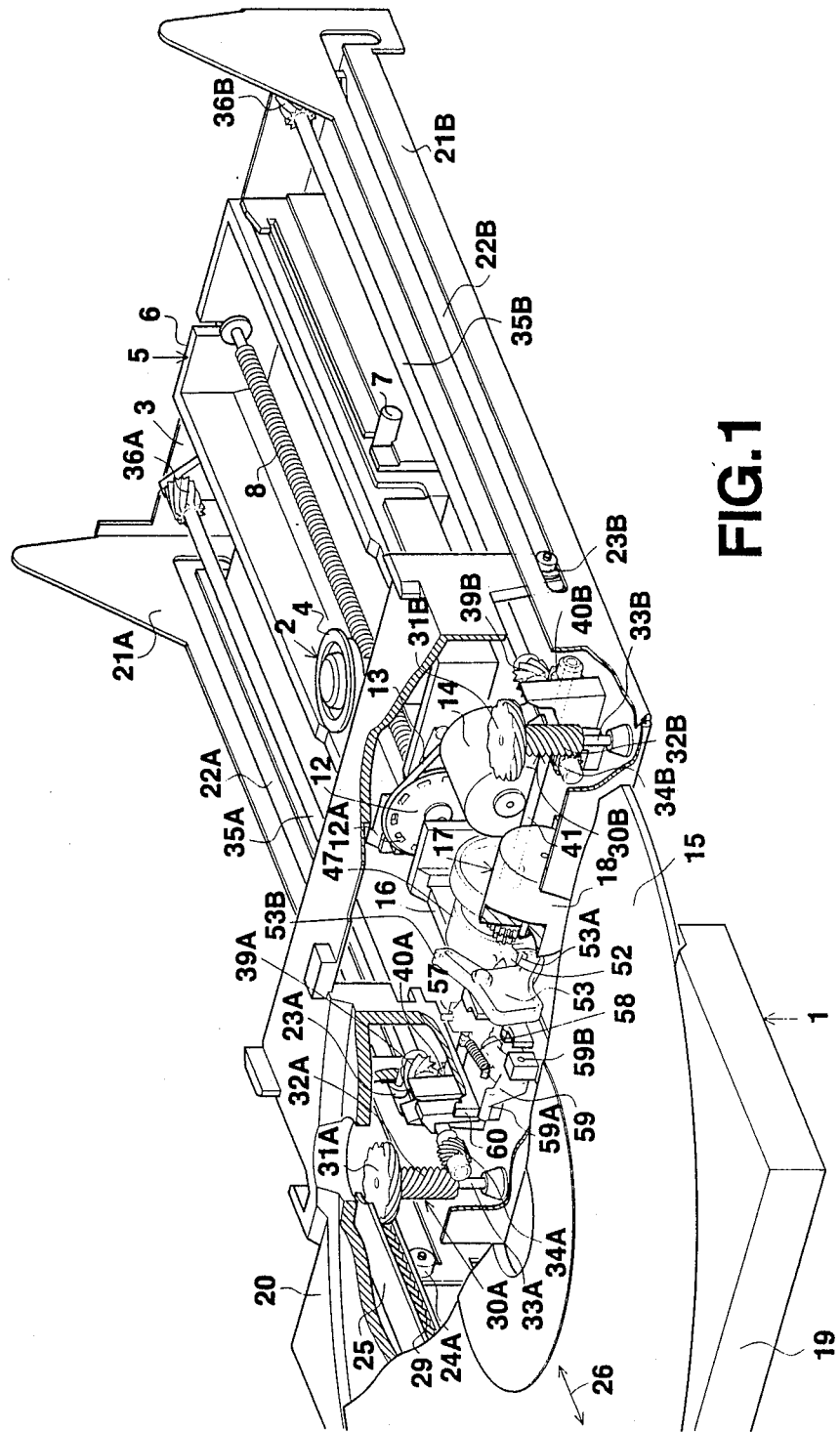
FIG. 1 is a partly cut-away perspective view of an apparatus comprising the loading device in accordance with the invention, the drawer being shown in the extended position.
Figure 2:
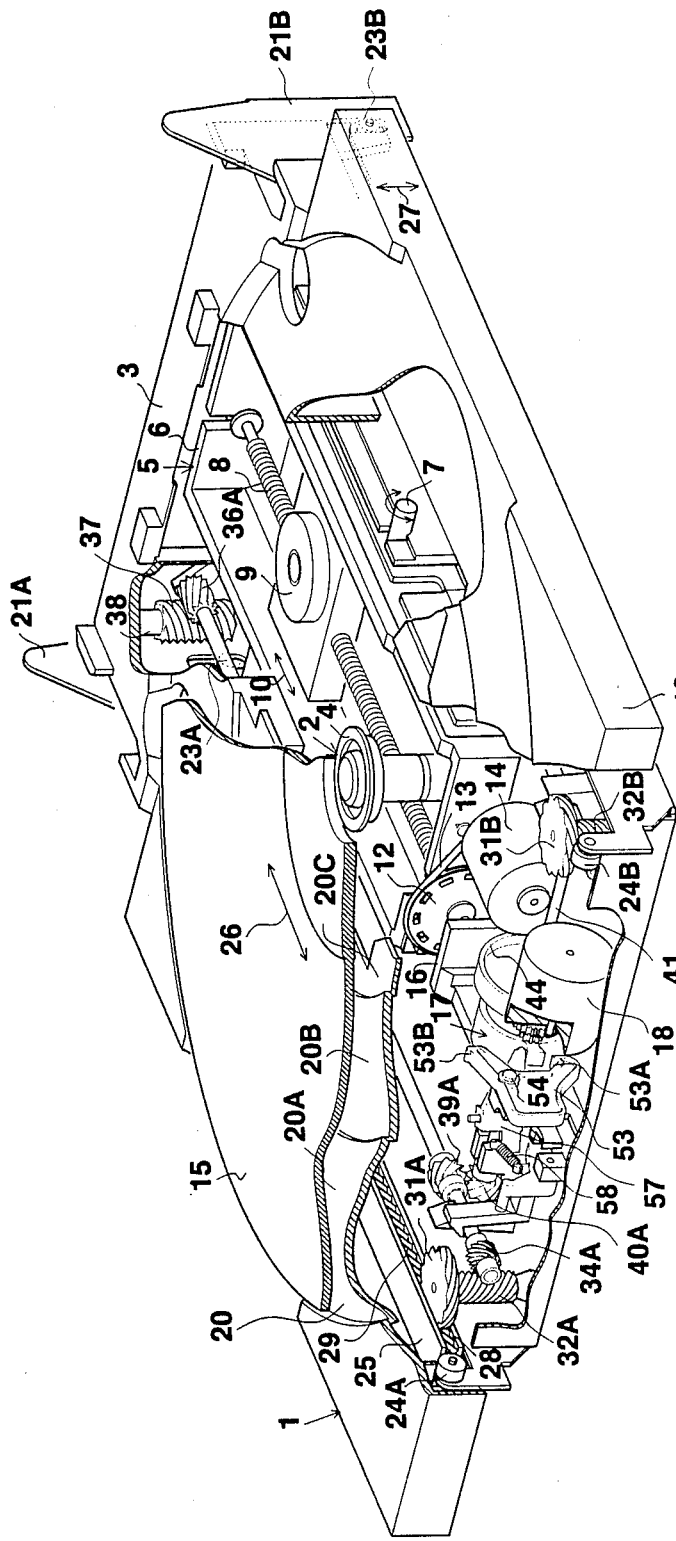
FIG. 2 is a partly cut-away perspective view of the apparatus of FIG. 1, the drawer being shown in the retracted position.

The loading device 1 shown in FIGS. 1 and 2 forms part of an apparatus 2, which may be, for example, an optical disc-record player and of which some parts and mechanisms which are relevant to the invention are shown. The housing 3 of the apparatus accommodates a turntable 4. Further, a tilting device 5 is shown, which device comprises a support 6 provided with journals 7, only one journal being visible in FIGS. 1 and 2. By means of the journals 7 the support 6 can be pivoted inside the housing 3. The support 6 carries a lead screw 8 on which an optoelectronic unit 9 is mountd which, when the lead screw 8 is rotated, is rectilinearly movable as is indicated by the double arrow 10 and which unit 9 comprises an objective 11. On one end the lead screw 8 carries a pulley 12 which can be driven by an electric motor 14 via a belt 13. The pulley 12 is provided with detection fields 12a which can be scanned by a detection means, not shown, to enable the position of the unit 9 to be detected electronically. Thus the position of the unit 9 can be controlled accurately by means of the motor 14 during operation of the apparatus 2. This is important for accurately reading or recording signals on a record carrier constituted by a disc 15. On the support 6 at the side of the pulley 12 the tilting device 5 comprises a fork 16 which is shown in more detail in FIGS. 3 to 6. By the inclusion of a differential 17 to be described in more detail hereinafter the fork 16 and hence the support 6 can be pivoted about the journals 7 by means of an electric motor 18, which also serves for driving the loading device 1. Thus, the tilting device 5 is capable of pivoting the unit 9, the motor 18 being electronically coupled to a detector means, not shown, during the pivotal movement, which detector means determines the angle over which the unit 9 is to be pivoted. This pivoting has the advantage that deviations caused by irregularities in the recording surface of the disc 15 and by an oblique position of a surface of the disc, and deviations caused by differences in height of the disc 15 relative to the objective 11 can be corrected in a suitable manner, so that a focus actuator (not shown) associated with the opto-electronic unit 9 need only provide correction for high-frequency height deviations of the objective relative to the disc. Alternatively, the turntable 4 may also be arranged on the support 6, so that the turntable is also pivotable relative to the housing 3, which is advantageous in order to minimise the mounting height of the apparatus 2, because during operation of the loading device 1 the turntable 4 can be pivoted slightly downwards and the disc 15 can readily move over the turntable. For a more extensive description of such a tilting device 5 reference is made to the document EP-A- No. 196,691 (U.S. Application No. 837,923, herewith incorporated by reference).

The loading device 1 comprises a drawer 19 by means of which the disc can be moved into and out of the housing 3 through an opening, not shown, in the wall of the housing 3. For this purpose the drawer 19 is provided with a platform 20 having a number of supporting sections 20A, 20B, 20C which are stepped downwards to the center of the drawer. In this way the drawer 19 enables discs 15 of different diameter to be moved towards the turntable 4 correctly prepositioned in the drawer. Thus, discs of different diameter can be transferred by means of the loading device 1 and by means of the turntable 4 and the unit 9 the apparatus 2 can scan discs of different diameter.

For guiding the drawer 19 the housing 3 comprises two upright walls 21A, 21B formed with L-shaped slots 22A, 22B constituting guideways for guide elements 23A, 23B on the drawer 19. These guide elements are constructed as rollers which are movable in the slots 22. On the upright walls 21A and 21B near the front of the housing 3 further rollers 24A and 24B respectively are provided, which rollers also serve as guide elements and during the drawer movement cooperate with guide rails 25, of which only the left-hand rail is shown in FIGS. 1 and 2. The rails 25 are integrated with the underside of the drawer 19 and together with the drawer they are suitably manufactured as an integrated plastic unit. The rails 25 are arranged mirror-symmetrically relative to a plane of symmetry through the drawer parallel to the horizontal direction of movement of the drawer, as indicated by the double arrow 26 in FIG. 1. The rollers 24A, 24B are arranged beneath the rails 25 in such a way that during the inward movement of the drawer, at the instant at which the guide elements 23B move in the short sections of the slots 22, the rollers are clear of the rails 25, enabling the drawer to be moved downwards in a substantially axial direction relative to the turntable 4. Thus the guide elements 23 and 24 in conjunction with the slots 22 and the rails 25 constitute guide means for guiding the drawer movement relative to the housing, the drawer being guided parallel to two guiding directions which enclose an angle with one another, namely the direction indicated by the double arrow 26 for the horizontal direction and the double arrow 27 for the vertical direction. However, it is to be noted that by means of the loading device 1 it is also possible in a manner to be described hereinafter to guide the drawer parallel to several guiding directions which enclose an angle with one another (see FIG. 12).

At the facing sides the rails 25 are provided with control grooves 28, the control grooves being suitably U-shaped and gear racks 29 being situated on the bases of the grooves, which gear racks extend parallel to the double arrow 26 and have teeth which are inclined relative to the horizontal. The inclination of the teeth relative to the horizontal plane may be between approximately 27° and 50° and is approximately 45° in the embodiment shown. The gear racks 29 form part of the drive elements 30A, 30B which serve for driving the drawer and which in a manner to be described hereinafter are driven by the electric motor 18 via the differential 17, which motor can also drive the tilting device 5.

The drive elements 30A, 30B comprise drive gears 31A, 31B which also have teeth which are inclined relative to the horizontal and which mesh with the gear racks 29 and are guided in the control grooves 28. First worm gears 32A and 32B are rigidly connected to and coaxial with the drive gears 31A and 31B respectively, the drive combinations of the drive gears 31 and the first worm gears 32 being rotatable on journals 33A and 33B respectively which are disposed vertically relative to the horizontal plane. The drive combinations are axially movable relative to the housing over the journals 33. Each of the worm gears 32A and 32B is driven by a second worm gear 34A and 34B respectively mounted on a drive shaft 35A and 35B respectively, which shafts have axes extending parallel to the double arrow 26. Near the rear of the housing 3 the drive shafts 35 carry worm gears 36A, 36B which drive worm gears 37 which, in a manner not shown, are rigidly connected to drive gears which are similar to the drive gears 31 and are axially movable over the journals 38. The drive gears, not shown, which are connected to the worm gears 37 are situated in the control grooves 29 at the end of the inward movement of the drawer 19. Thus, these drive gears can control the drawer 19 via the gear racks 29 at the end of the inward movement and at the beginning of the outward movement of the drawer 19.

The drive shafts 35 further carry worm gears 39A, 39B which are driven by worm gears 40A and 40B respectively, which are fixed to a main drive shaft 41. This main drive shaft extends through the differential 17, as is shown in FIGS. 3 to 7.

Figure 3:
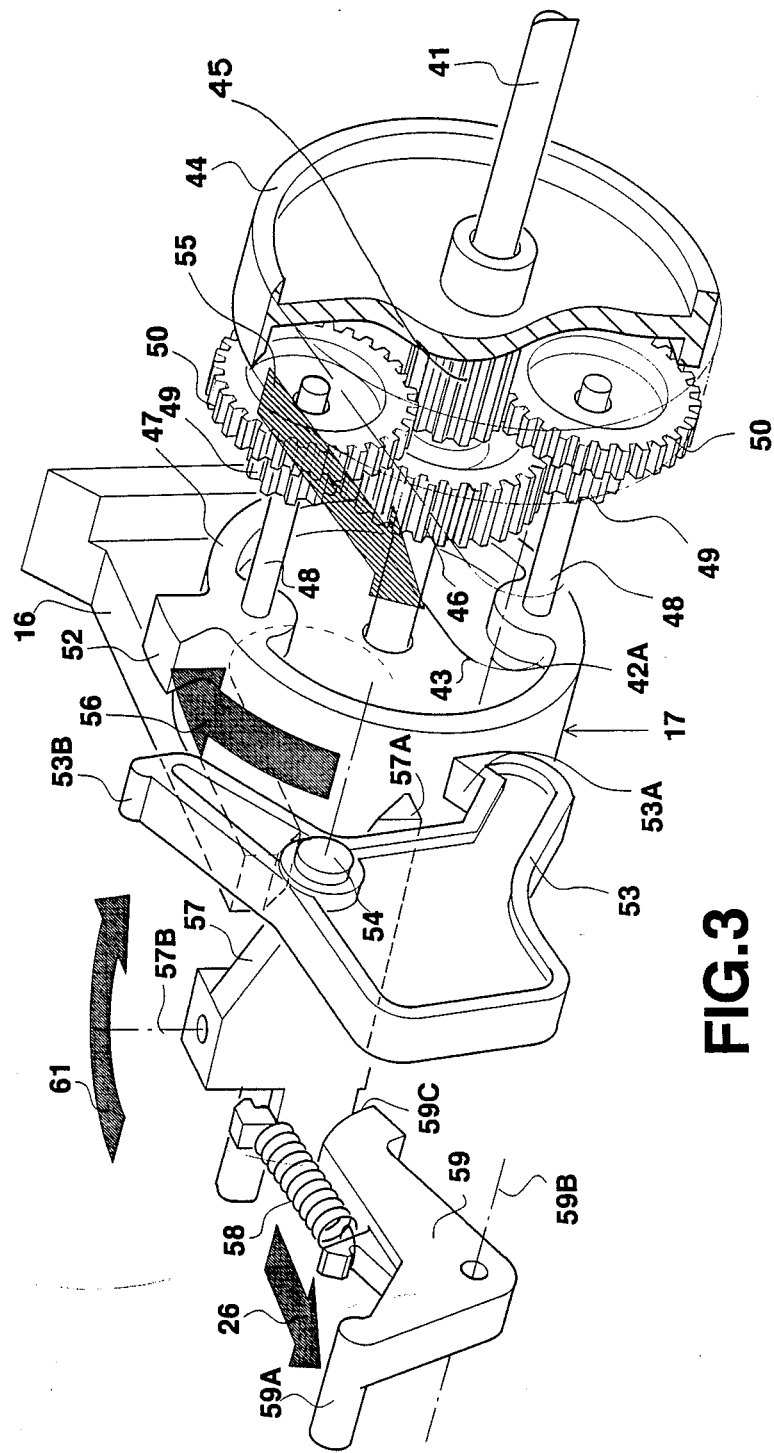
FIG. 3 is a perspective view of a differential arranged in the drive system of the drawer, the drawer being shown in the extended position.
Figure 4:
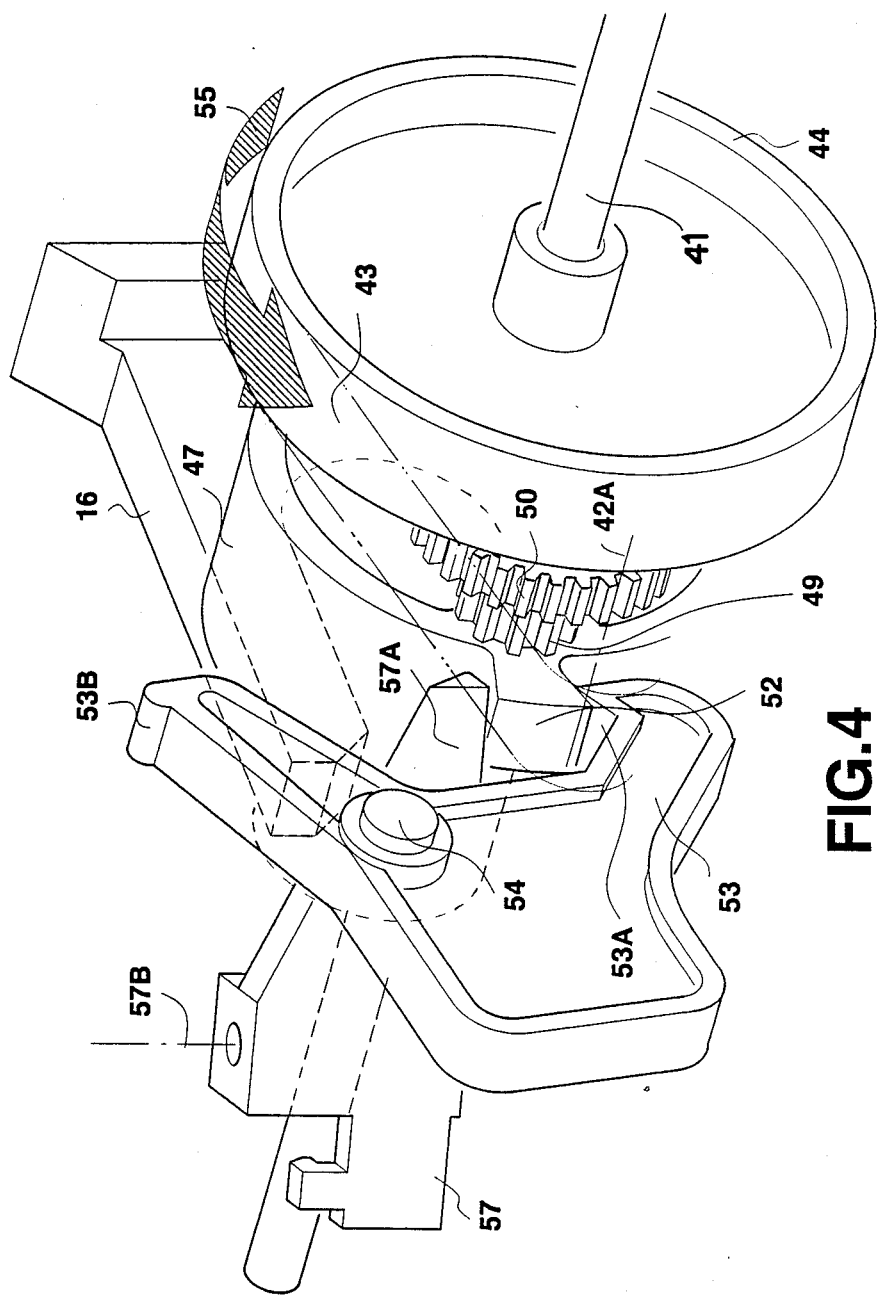
FIG. 4 is a perspective view of the differential in the situation in which the drawer is driven in an outward direction.
Figure 5:
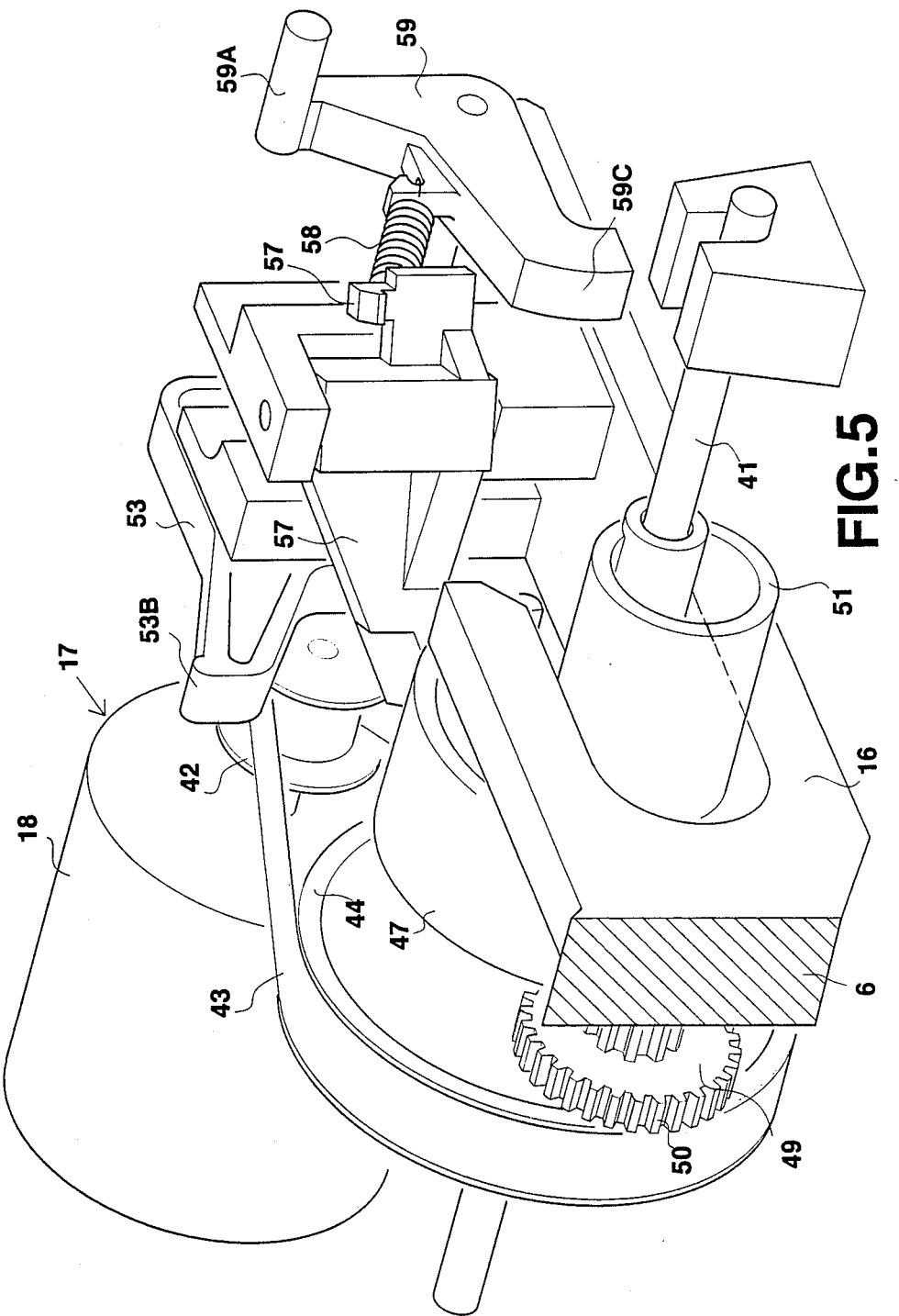
FIG. 5 is a perspective view of the differential from another side in a situation in which the drawer is driven.
Figure 6:
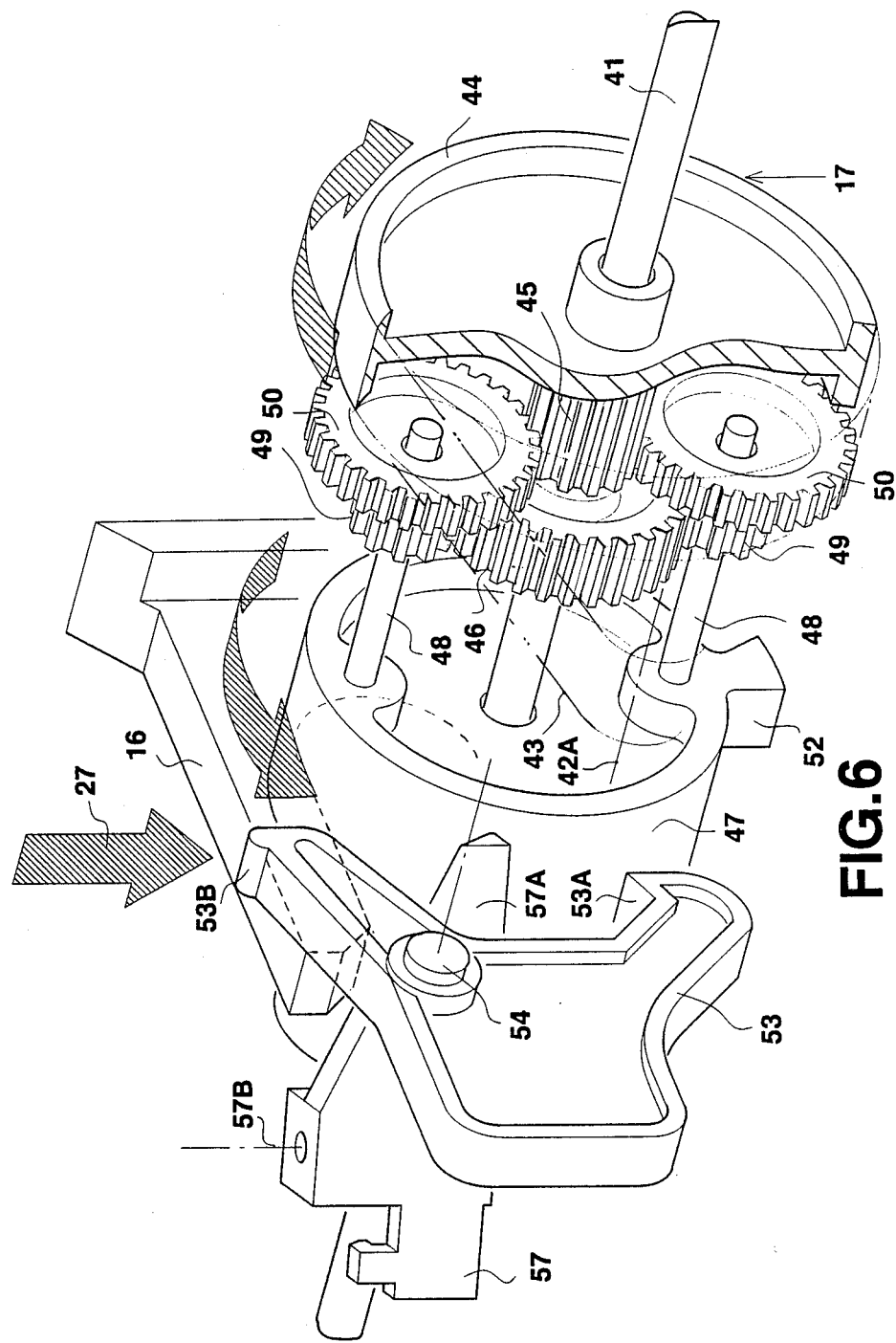
FIG. 6 is a perspective view of the differential shown from the same side as in FIGS. 3 and 4, the drawer being shown in the retracted position and the tilting device being driven.
Figure 7:
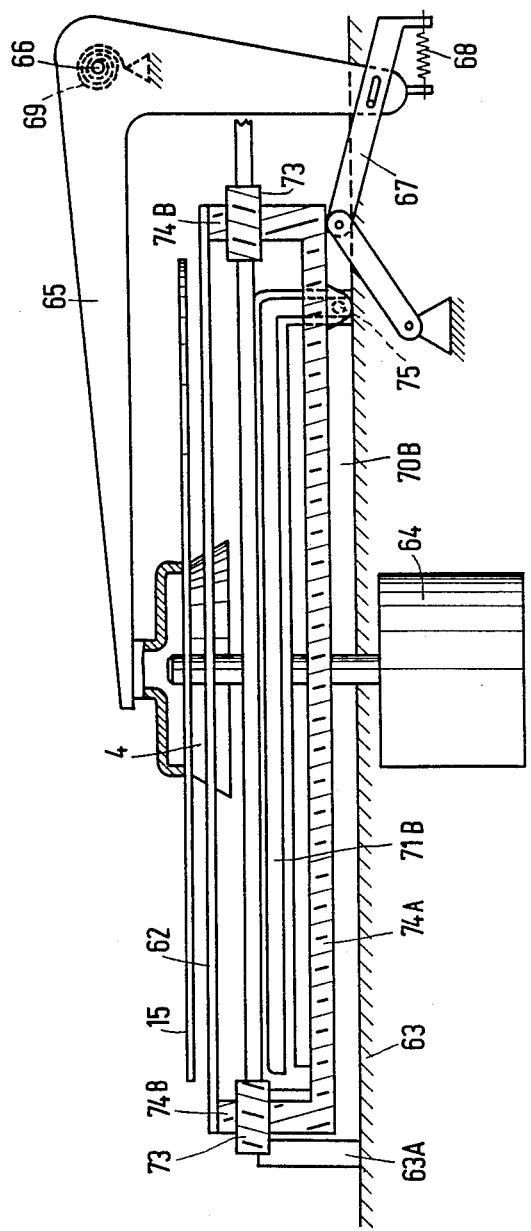
FIG. 7 shows diagrammatically and partly in crossectional view a second embodiment of a loading device and parts of an apparatus in accordance with the invention.
Figure 8:
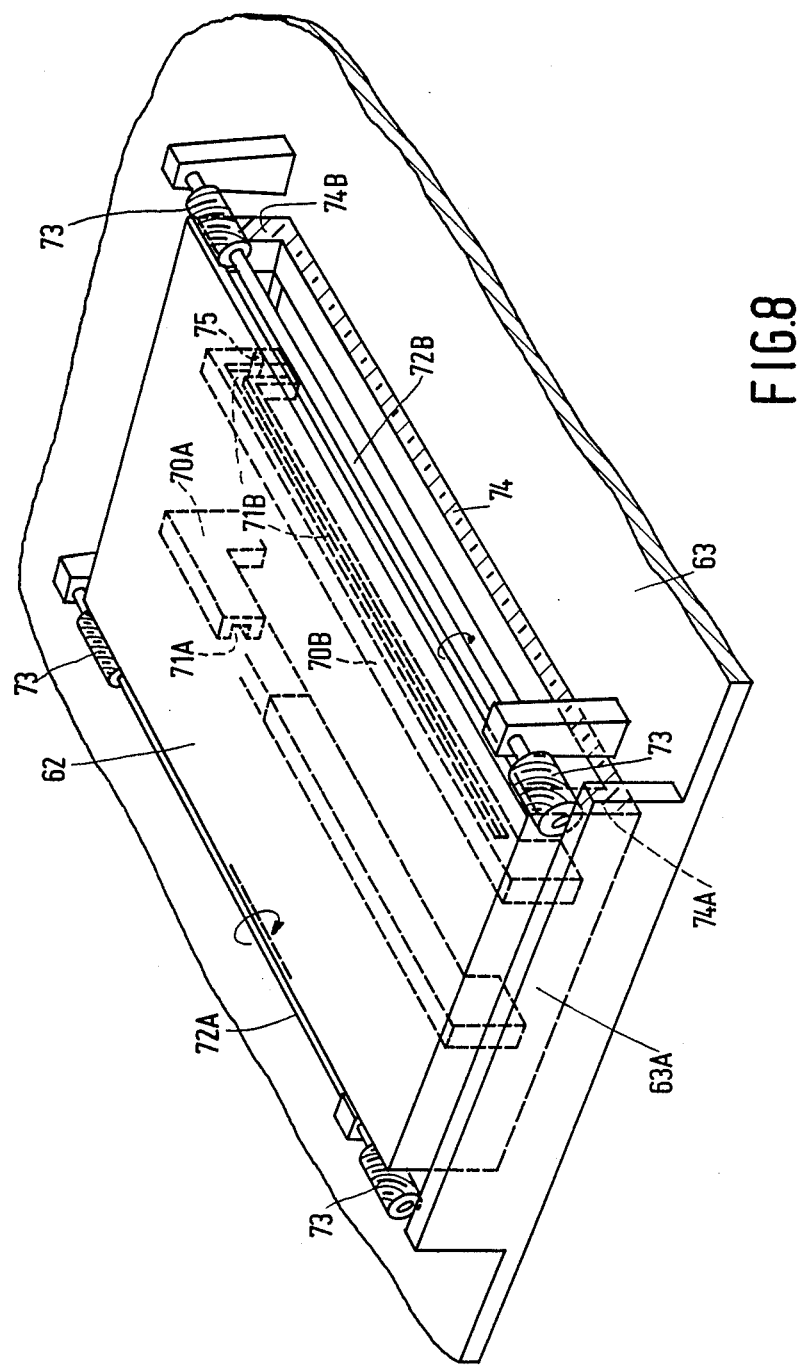
FIG. 8 is a perspective view of the loading device of FIG. 7, the drawer being shown in the retracted position.
Figure 9:
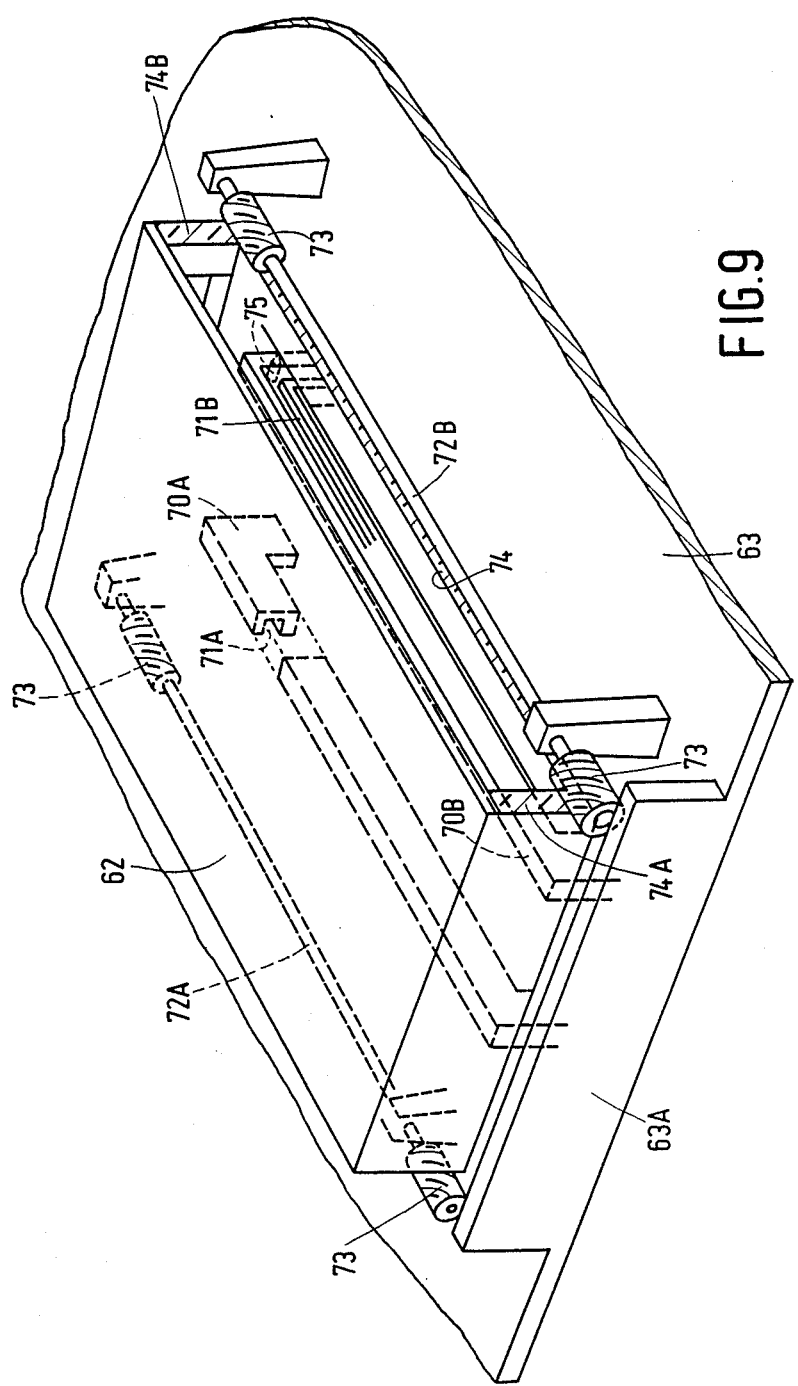
FIG. 9 is a perspective view of the loading device of FIG. 7, the drawer being raised.
Figure 10:
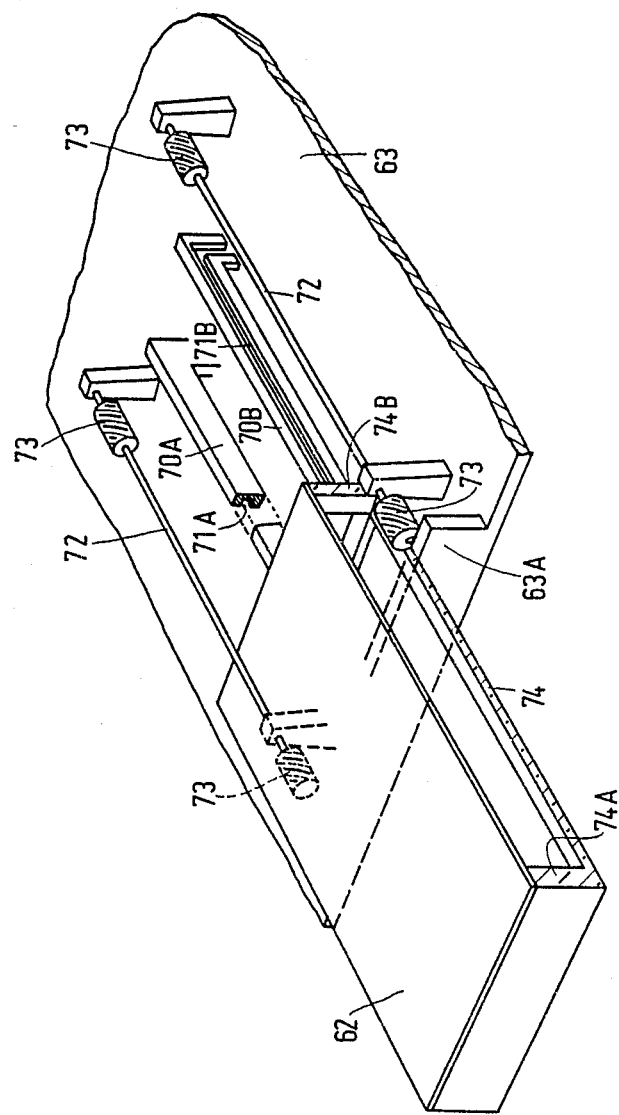
FIG. 10 is a perspective view of the loading device of FIG. 7, the drawer being shown in the extended position.

The differential 17 is driven by the motor 18 via a pulley 42 (see FIG. 5) whose axis of rotation has the reference numeral 42A in FIGS. 3, 4 and 6. The pulley 42 drives a belt 43 which is wrapped around a pulley 44. The pulley 44 is coaxial with the main drive shaft 41 but can rotate freely relative to this shaft. A gear 45, which is also concentric with the drive shaft 41, is rigidly connected to the pulley and adjacent the gear 45 a gear 46 is rigidly connected to the main drive shaft. A spider 47 is mounted for free rotation on the shaft 41 and has two pins 48 which extend parallel to the shaft 41 and which carry freely rotatable gears 49 and 50 which are fixed to each other and whose teeth are in mesh with the gear 46 and the gear 45 respectively. The spider 47 is rigidly connected to an eccentric 51 situated between the limbs of the fork 16. The spider 47 further carries a projection 52 which during the inward movement of the drawer 19 abuts against a stop 53A of a twoarm catch 53 which is pivotable about a spindle 54 connected to the housing 3. The motor 18 then causes the pulley 44 to rotate in a direction opposite to that indicated by the arrow 55 in FIG. 4. Since the spider 47 is blocked the pulley 44 now drives the shaft 41 via the diffrerential 17. As a result of this, the drive elements 30A, 30B described in the foregoing now drive the gear racks 29. On account of the inclined teeth of the gear racks 29, the drive gears 31, the worm gears 32 and 34 and the worm gears 36 and 37 a force F comprising components F1 and F2 as indicated by the arrows 26 and 27 is exerted on the drawer 19 during the inward movement of this. The guide elements 23 move backwards through the slots 22 and downwards through the short sections of the slots 22, the drive combinations of the gears 31 and 32 and of the wheels 37 and the drive wheels rigidly connected thereto moving axially downwards at the same time. By a suitable choice it is now possible to obtain a comparatively slow vertical movement and a comparatively rapid horizontal movement.

During the movement of the drawer 19 the catch 53 remains in the latched position as shown in FIGS. 1 and 4, in which position the projection 52 is in abutment with the stop 53A. The catch 53 occupies this position as a result of the location of centre of gravity of the catch relative to the spindle 54. At the end of the downward movement of the drawer to the position shown in FIG. 2 the underside of the drawer, in a manner not shown, presses against a stop 53B on the second arm of the catch 53, so that the catch pivots about the spindle 54 and the stop 53A moves away from the projection 32. In this situation, the disc 15 being situated on the turntable 4, the motor 18 can actuate a tilting device 5 by rotating the spider 47 via the differential 17, which as already stated results in the fork 16 being controlled via the eccentric 51. It is to be noted that for controlling the fork 16, as is shown in FIG. 5, only a limited to and fro rotation of the spider 47 is required. During this rotation, the spider 47 now being no longer retained, the main drive shaft 41 is disengaged from the differential 17, so that the drawer remains in the retracted position during control of the fork 16. During this to and fro rotation of the spider 47 the support 6 is thus pivoted about the journal 7, which as already stated has the advantage that deviating positions of the recording surface of the disc 15 relative to the objective 11 can be corrected.

If the disc is to be removed from the apparatus 2 an actuating button, not shown, is operated, which by means of an electronic control circuit causes the motor to be rotated in a direction in which the pulley rotates in the direction indicated by the arrow 56 and the spider 47 rotates in the direction indicated by the arrow 56 (see FIG. 3), during which rotation the projection 52 abuts against a stop 57A on a catch 57 which is pivotable about a pivotal axis 57B. The catch 57 occupies this latching position because a spring 58, which is connected to a third catch 59, tends to retain the catch 57 in the latching position shown in FIG. 5. Thus, the spider 47 is latched again after rotation in the direction indicated by the arrow 56 (FIG. 4), which results in the shaft 41 being driven by the differential 17 in a direction opposite to the direction during the inward movement of the drawer 19, causing the drive combination of the gear 31 and 32 and of the gear 37 and the drive wheels rigidly connected thereto to be moved axially upwards, as a result of which movement the guide elements 23 slide from the position shown in FIG. 2 through the short sections of the slots 22 and the drawer moves upwards as is indicated by the arrow 27, after which the drawer moves outwards as is indicated by the arrow 26. It is to be noted that after the upward movement the first cable 53 has resumed the latching position as shown in FIG. 4 under the influence of the force of gravity, because the pressure of the drawer on the strop 53B has now ceased.

At the end of the outward movement a projection 60 on the underside of the drawer 19 abuts against the stop 59A on the catch 59, causing this catch to be pivoted about a pivotal axis 59B. As is shown in FIG. 3, this causes a stop 59C on the third catch 59 to abut against the second catch 57, so that this catch is pivoted about the axis 57B, as is indicated by the arrow 61. The stop 57A on the catch 57 now moves away from the projection 52 on the spider 47, so that the spider is rotated slightly further in the direction indicated by the arrow 56. As the spider 47 is now unlocked, the main drive shaft 41 is no longer driven via the differential 17 and the drawer movement stops. The spider 47 carries a further projection, not shown, which during the rotation of the spider has actuated a switch, not shown, causing the motor 18 to be stopped. The projection 52 is rotated slightly further from the latched position into, for example, a position as shown in FIG. 3. In this position of the drawer the disc 15 can be removed to be replaced by another disc.

After insertion of a disc the drawer can easily be moved inwards again from the position shown in FIG. 1. This only requires a light push against the front of the drawer 19. As a result of this push the projection 60 no longer abuts against the third catch 59 and under the influence of the spring 58 the second catch 57 is again moved into the latching position. As a result of this pushing movement the main drive shaft 41 is driven, causing the spider 47 to rotate in the direction indicated by the arrow 56 and the switch, not shown, to be released again, so that the motor 18 now starts to rotate in a direction in which the differential again rotates the spider 47 to a position as shown in FIG. 4 and in which the pulley 44 rotates again in a direction opposite to that indicated by the arrow 55. As a result of this the spider 47 rotates in a direction opposite to that indicated by the arrow 56 and the projection 52 moves past a bevelled edge of the stop 57A, causing the projection 52 to be latched again behind the stop 53A on the first catch 53. After this the drawer movement in the inward direction can recommence.

By an appropriate choice of the inclined teeth of the gear racks 29, the drive gears 31, the worm gears 32 and 34, and the worm gears 36 and 37 it is possible to obtain a comparatively slow vertical movement during which the guide elements 23 move in the short sections of the slots 22. During this vertical movement a disc-pressure means, not shown, for pressing the disc 15 against the turntable 4 can be actuated by the drawer 19, whilst during the upward vertical movement this disc-pressure means can be lifted. This comparatively slow movement over a short distance enables a motor 18 of comparatively low power to be used. Once the vertical movement has been completed the drawer 19 can be moved over a comparatively long distance with a comparatively high speed during its outward horizontal movement. A speed ratio of approximately 1:2.8 can be realised simply, but even higher speed ratios are also possible. For example, depending on the choice of the inclination of the teeth of the gear racks and the gear wheels a maximum speed ratio of 1:4 can be obtained. By an appropriate choice of the inclination of the teeth the speed in the horizontal direction and the force in the vertical direction can be selected freely and independently of one another within wide limits.

Further it is to be noted that the loading device 1 in accordance with the invention enables discs of different diameters to be loaded onto the turntable 4. For a further description of how signals are recorded on or reproduced from the disc 15, discs of different diameters being used, reference is made to the Applicant's simultaneously filed U.S. Patent Application Ser. No. 131,147.

FIGS. 7, 8, 9 and 10 diagrammatically show a second embodiment of a loading device in accordance with the invention. A drawer 62 can be moved inwards and outwards relative to a housing 53, in the same way as in the first embodiment, a part of the drawer movement being in the horizontal direction and, at the end of the inward movement, in the vertical direction. In this case the inward movement also serves for loading a disc 15 onto a turntable 4, which is driven by a motor 64. Further, there is provided a disc-pressure member 65 which is pivotable about a spindle 66 and which is coupled to a bellcrank lever 67 via a pin-and-slot coupling. Between the bellcrank lever 67 and the disc-pressure member 66 a spring 68 is arranged, which spring, once the drawer 62 has been lowered, transmits the force exerted on the lever 67 by the drawer 62 to the disc-pressure member 65, so that the spring urges the disc-pressure member towards the turntable 4 about the spindle 66 against the force of a spiral spring 69. During the upward movement of the drawer 62 the spiral spring 69 ensures that when the force exerted on the drawer by the lever 67 ceases the disc-pressure member can move upwards. The pin-and-slot coupling permits the movement of the disc-pressure member relative to the bellcrank lever.

The housing 63 has two upright walls 70A and 70B in which L-shaped slots 71A and 71B respectively are formed in the same way as in the first embodiment. Another upright wall 63A at the front of the housing 63 also plays a part in the various movements of the drawer 62. Further, there are provided drive shafts 72A and 72B which carry worm gears 73 near their ends. The worm gears 73 are in mesh with a gear rack 74 on the two upright sides of the drawer 62, the toothed portions thereof being arranged as a U. A basic portion 74A is situated near the bottom of the drawer 62 and at both ends the basic portion 74A is adjoined by an upright portions 74B on the side walls of the drawer. As is clearly shown in the Figures, the teeth of each basic portion 74A continue in the upright portions 74B without interruption. The two drive shafts are coupled to each other in a manner not shown by means of a main drive shaft which is similar to the shaft 41 in the preceding embodiment, which main drive shaft is coupled to a drive motor (not shown). Further, this embodiment may also employ a differential, not shown, between the motor and the drive shafts 72. The drawer 62 is guided not only by the upright wall 73A but also by means of a guide element 75 which is guided in the slots 70A and 70B respectively.

The drive elements constituted by the gear racks 74 and the worm gears 73 which mesh with these racks ensure that when the drive shafts 72 are driven a force is exerted on the drawer during its inward and outward movement, which force in the same way as in the first embodiment enables the drawer 62 in the loading device shown in FIGS. 7 to 10 to follow the L-shaped path defined by the slots 71. In this respect it is important that in these embodiments the tooth flanks of the teeth of the gear racks 74 are inclined at angle of approximately 30°. However, it is also possible to use a slightly smaller tooth inclination. As a result of this tooth inclination the drawer 62 is lifted, starting from the position shown in FIG. 7, when the worm wheels 73 are driven on the upright portions 74B and 74C. The drawer is then guided in the vertical direction owing to the presence of the upright wall 63A and the short section of the slot 71. Thus, the drawer 62 moves from the position shown in FIGS. 7 and 8 to the lifted position shown in FIG. 9. When driving of the drive shafts 72 continues the worm gears 73 now begin to drive the basic portions 74A of the gear racks 74. The choice of the inclination of the teeth, in the same way as in the preceding embodiment, ensures a suitable horizontal movement of the drawer 62, which movement is performed at a higher speed than in the vertical direction. During this horizontal movement the drawer is guided by the horizontal sections of the slots 71 and by the upper side of the upright wall 63A. When the self-braking action of the teeth of the drive elements is ignored and the inclination of the teeth is 30°, the horizontal speed will be approximately a factor of 1.7 times larger than the vertical speed. Alternatively, when a slightly smaller inclination is adopted a speed ratio of approximately 1:2 can be obtained. This embodiment also has the advantage that during the vertical movement, in view of the comparatively low drawer speed, power is available for driving, for example, the disc-pressure member 65, whilst during the horizontal movement a comparatively high speed over a large distance is possible, again enabling the horizontal speed and the vertical force to be selected independently of each other within wide limits. A further advantage of this embodiment is that the drawer 62 can have a comparatively small mounting height, driving being effected with a minimal number of parts. Moreover, the mounting depth of the loading device in accordance with the present embodiment can be minimised.

The embodiment of the loading device in accordance with the invention shown in FIG. 11 employs a combination of the drive elements associated with the loading devices in accordance with the two preceding embodiments. Corresponding parts bear corresponding reference numerals. In this embodiment a drawer 76 is provided with slots 22 in the side walls, in which slots gear racks 29 are formed. Further, upright gear racks 77 are provided on the sides. The gear rack 29 is in mesh with a drive gear 31 which is rigidly connected to a worm gear 32, forming a drive combination which is axially movable over a journal 33 secured to the housing 63. A worm gear 34 drives the worm gear 32 and is mounted on a drive shaft 35 which also carries a wrom gear 36 which is in mesh with the teeth of the gear rack 77. The drive shaft 35 is driven via gears 39 and 40 by means of the main drive shaft 41, which is driven by an electric motor. Again the teeth of the gear racks 29 and 77 are inclined, so that during driving by means of the main drive shaft 71 a force is exerted which, owing to the presence of guide means, not shown, of the drawer 76, results in the drawer initially being moved in a vertical direction and subsequently in a horizontal direction. In this respect it is important that the radii of the worm gears 34 and 36 are equal. In this embodiment the vertical speed can also be substantially lower than the horizontal speed, the aforementioned advantages being also obtained. This embodiment also enables a maximum speed ratio of 1:4 to be obtained.

As is shown in FIG. 12 the path which the drawer follows during the movement by means of the loading device in accordance with one of the preceding embodiments is not restricted to an L-shaped path. In principle, the drive elements including gears and gear racks with inclined teeth also enable the drawer to be guided along different paths. On account of the force F which is directed obliquely during the movement, which force has horizontal and vertical components F1 and F2 respectively, various paths for the drawer movement can be obtained, the sole criterion being that the paths should be situated in one quadrant, i.e. the sign of the derivative of the path followed during the drawer movement should not change.

It is to be noted that the loading device in accordance with the invention is not only suitable for use in an apparatus of the type described herein and intended for cooperation with a disc. The loading device is also suitable for use in other apparatuses of a type intended for recording and/or reproducing signals on/from a record carrier, such as magnetic-tape apparatuses. For example, in a magnetic-tape apparatus the invention has the advantage that it provides a comparatively large force in the vertical direction, enabling for example the front cover of a magnetic-tape cassette to be opened and/or the braking device of the reels to be lifted, another advantage being the comparatively high horizontal speed over a large distance, enabling the cassette to be loaded. For such a use it is also advantageous that a motor with a comparatively low driving power may be used. Another significant advantage is that within certain wide limits the force necessary to move the drawer in the vertical direction can be selected independently of the horizontal speed of the drawer. Further, it is advantageous that during driving of the drawer the inclined teeth produce a comparatively low noise level.

What is claimed is:

1. Apparatus for recording and/or reproducing signals on/from a record carrier, comprising
   a housing having a wall with an opening therein,
   a drawer for moving said record carrier into and out of said housing through said opening,
   guide means for guiding the movement of the drawer relative to the housing and parallel to first and second guiding directions which enclose an angle with one another, said guide means comprising guideways and guide elements which are guided therein,
   drive means for moving the drawer relative to the housing, said drive means comprising gear racks fixed on said drawer, gears for driving said racks, and mutually parallel drive shafts for driving said gears, said gear racks and gears each having teeth whose flanks are inclined in such a way relative to the axes of the respective drive shafts that the force exerted on the drawer has first and second components parallel to respective first and second guiding directions.

2. Apparatus as in claim 1, wherein said gears include drive gears meshing with said gear racks, said gear racks being situated in control grooves in which the drive wheels are guided axially relative to the axes of the rotation of the drive shafts.

3. Apparatus as in claim 2, further comprising a worm gear coaxially fixed to each drive gear, the drive combination of each drive gear and worn gear being axially movable.

4. Apparatus as in claim 3, wherein each worm gear of the drive combination is drive by a worn gear fixed to one of said drive shafts, in such a way that, depending on the position of the guide elements in the guideways, either each combination rotates, causing the drawer to move in the first guiding direction, or each combination moves axially, causing the drawer to move in the second guiding direction.

5. Apparatus as in claim 1, wherein each gear rack comprises portions which enclose an angle with one another, said gears comprising drive gears which cooperate with one portion of each rack during movement of the drawer in the first guiding direction and which cooperate with the other portion of each rack during movement of the drawer in the second guiding direction.

6. Apparatus as in claim 5, wherein said drawer has a bottom wall and a pair of upright walls, said portions of said gear rack being situated on respective said bottom and upright walls.

7. Apparatus as in claim 6, wherein the teeth of each portion of each gear rack are continuous, the inclination of the teeth relative to the first guiding direction being substantially thirty degrees.

8. Apparatus as in claim 1, further comprising a mechanism to be driven after termination of the drawer drive,
   a differential in said drive means to drive said mechanism.

9. Apparatus as in claim 8, wherein said mechanism comprises a tilting device for tilting an objective by means of which signals are recorded and/or read from a disc shaped record carrier.

10. Apparatus as in claim 1, wherein the guide elements are fixed to the drawer and the guideways are fixed to the housing.

* * * * *